Feb. 22, 1938.   W. G. COOK   2,109,229
ELECTRIC CONTROL MECHANISM FOR VOTING MACHINES
Filed July 30, 1932   3 Sheets-Sheet 2
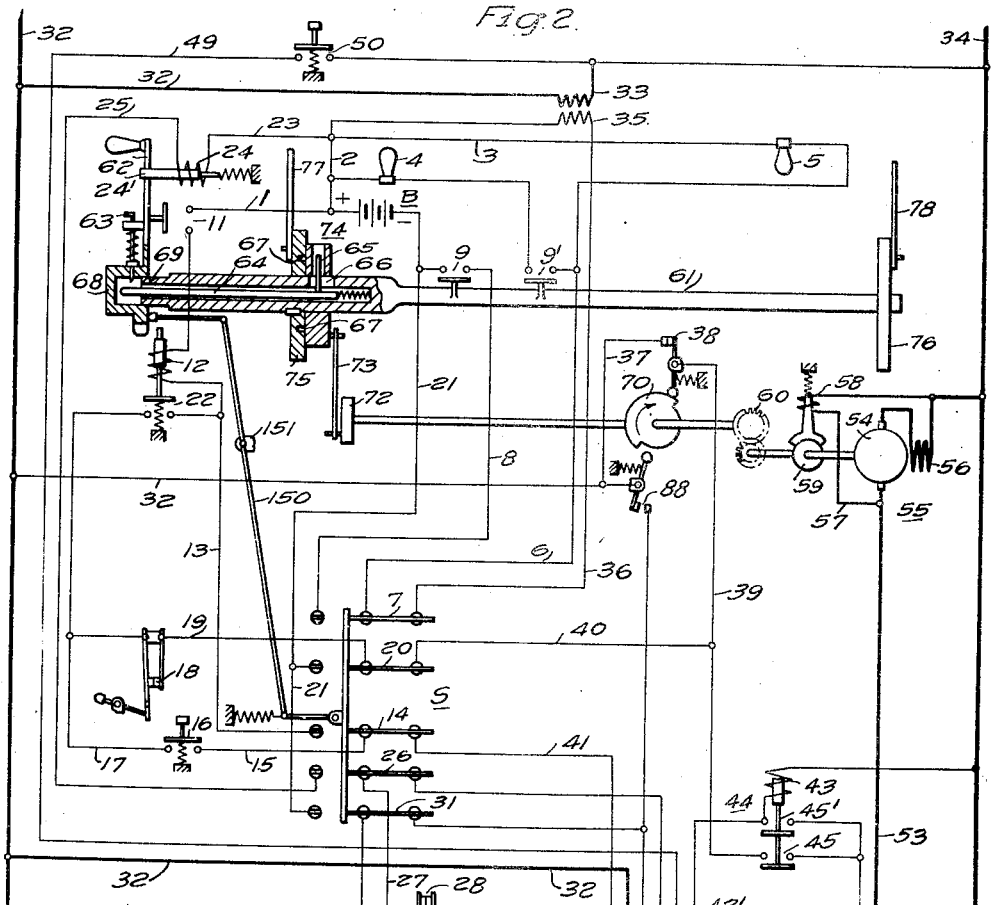
Fig. 2.
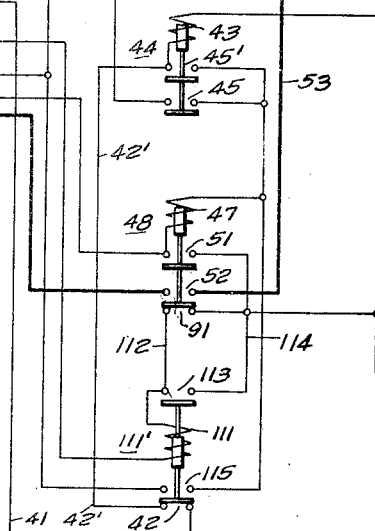
Fig. 4.
| Sw. No. | Sequence of Closing of Switches | | | | | | | | | | |
|---|---|---|---|---|---|---|---|---|---|---|---|
| | a | b | c | d | e | f | g | h | i | j | k |
| 9 | | | | O | O | O | O | O | | | |
| 11 | O | O | O | | | | | | O | O | O |
| 16 | O | | | | | | | | | | |
| 18 | O | O | O | O | O | O | O | O | O | O | |
| 22 | | | O | O | | | | | | | |
| 28 | O | O | O | | | O | O | O | O | | |
| 29 | O | O | O | O | | O | O | O | O | | |
Fig. 5.
| Sw. No. | Sequence of Closing of Switches | | | | | | | | | |
|---|---|---|---|---|---|---|---|---|---|---|
| | a | b | c | d | e | f | g | h | i | j |
| 9 | | | | | O | O | O | | | |
| 11 | O | O | O | | | | | O | O | O |
| 16 | O | | | | | | | | | |
| 18 | O | O | O | O | O | O | O | O | O | |
| 22 | | | O | O | | | | | | |
| 28 | O | O | O | | | O | O | O | | |
| 29 | O | O | O | O | | O | O | O | O | |
WITNESSES:
C. A. McCloskey
Paul E. Friedemann
INVENTOR
Willard G. Cook.
BY
W. R. Coley
ATTORNEY Feb. 22, 1938.  W. G. COOK  2,109,229
ELECTRIC CONTROL MECHANISM FOR VOTING MACHINES
Filed July 30, 1932   3 Sheets-Sheet 3

WITNESSES:
R. S. Williams
Paul E. Friedemann

INVENTOR
Willard G. Cook.
BY W. R. Coley
ATTORNEY

Patented Feb. 22, 1938

2,109,229

UNITED STATES PATENT OFFICE 2,109,229

ELECTRIC CONTROL MECHANISM FOR VOTING MACHINES

Willard G. Cook, Forest Hills, Pa., assignor to Westinghouse Electric & Manufacturing Company, East Pittsburgh, Pa., a corporation of Pennsylvania Application July 30, 1932, Serial No. 626,491

3 Claims. (Cl. 235—54)

My invention relates to controlling devices for voting machines and the like, and more particularly to control mechanisms operable by the election judge and voter, or other person, respectively, to control the sequence of operation of various elements of the machine.

One object of my invention is to provide for locking the voting machine operating devices while the ballot is being cast to prevent jamming of the machine.

Another object of my invention is to provide means for preventing final operations of the voting machine when the ballot has not been properly cast.

It is also an object of my invention to prevent the election judge from interfering with the voting operations.

Another object of my invention is to provide for locking the voting machine to prevent any further operation thereof after a print of the votes cast on a given machine has been taken.

It is also an object of my invention to provide means whereby the voter cannot inadvertently complete the cycle of the voting operation of the machine without having cast the ballots he wishes to cast.

A still further object of my invention is to provide for operating the voting machine by two distinct operations, which operations cannot be completed except when the voting devices of the machine have been properly actuated.

Other objects and advantages will become more apparent from a study of the following specification when considered in conjunction with the accompanying drawings, in which:

Fig. 2 is a diagrammatic showing of a modified control system;

Figure 1:
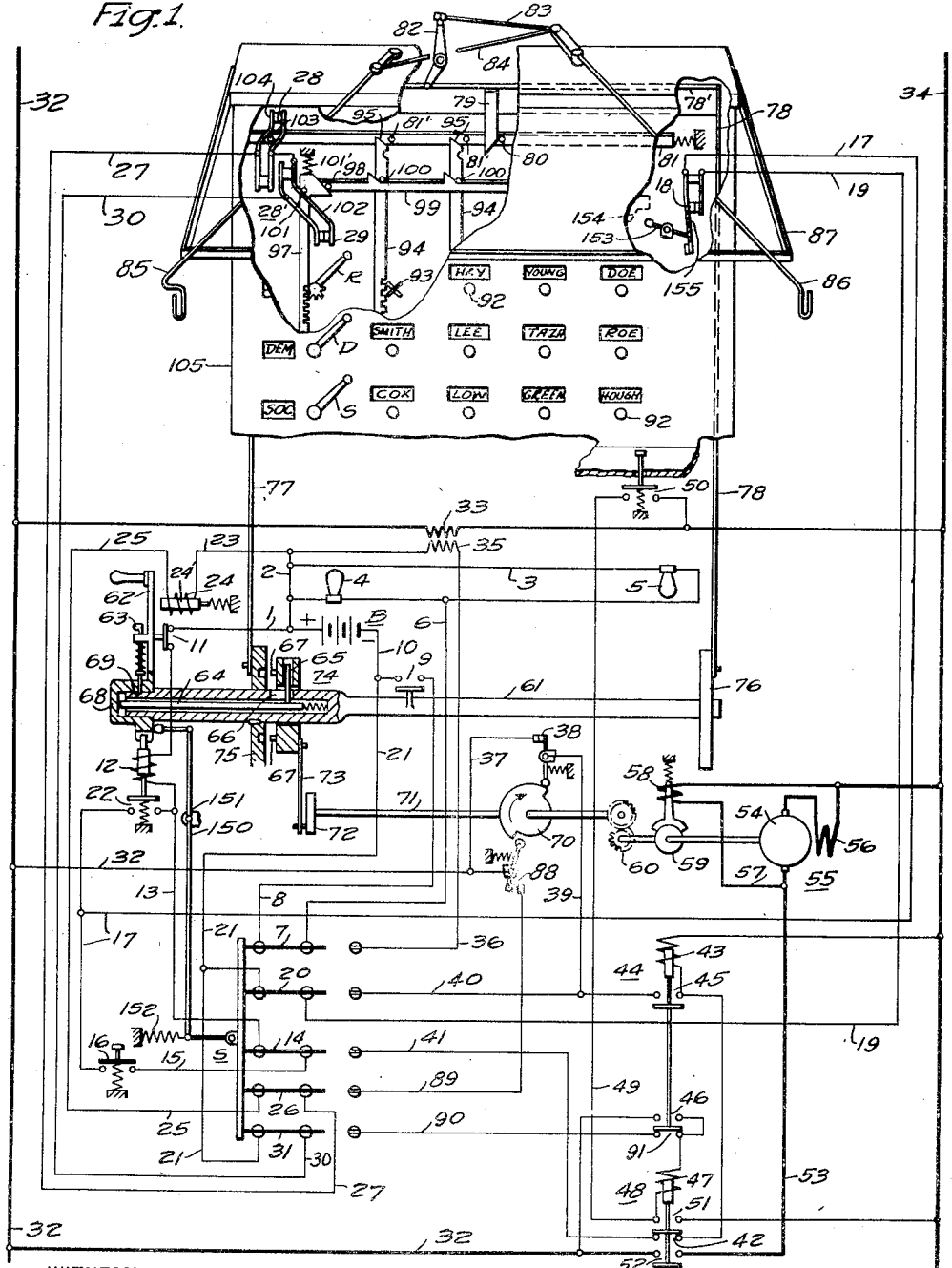
Figure 1 is a schematic showing of a voting machine provided with my electrical control devices illustrated more or less diagrammatically.

Referring more particularly to Fig. 1 of the drawings, 105 generally designates a voting machine provided with the conventional candidate voting mechanisms 92 and party levers R, D and S. It is, of course, understood that this machine is designed for more candidates per party and more parties than shown in Fig. 1. However, for the sake of simplicity only, three party levers have been shown and only four candidate voting means 92 per party have been indicated.

The voting machine, to insure a secret ballot, is provided with a curtain rod 87 and curtain actuating levers 85 and 86 which move the curtains on rod 87 together to hide the voter from view. The levers 85 and 86 are connected to links 83 and 84 which are actuated by means of a bellcrank lever 82 which, in turn, is operated from the vote signal slide 78'. The manner of this operation will be discussed more in detail hereinafter.

The particular voting machines disclosed in this application show a vertically disposed rod 97 actuated by any one of the party levers, R, D, or S which rod 97 is provided with a locator spring 101' for re-positioning the party lever that may have been actuated by a voter to its non-actuated position. Most voting machines, however, have no automatic means for re-positioning the actuated party lever to its non-actuated position and in consequence the control system herein provided is designed to ensure a proper and safe operation of the voting machine regardless of the locator spring 101'. In other words, whether the spring 101' be present or fail to function is immaterial, the proper voting sequence is ensured nevertheless.

To actuate the necessary mechanisms of the voting machine after the ballot has been cast, a motor 55 is provided which motor has a brake 59 for holding the motor and machine in a given position after certain operations of the machine. A reduction gear 60 is provided for actuating the main shaft 61 through shaft 71, crank disc 72, link 73, and clutch mechanism 74.

For motor operation of the machine, the clutch mechanism 74 shown in Fig. 1 must, of course, be in the position shown in Fig. 2.

The arrangement of the parts as shown in Fig. 1 is for manual operation of the various elements of the machine. This manual operation is accomplished by proper manipulation of the crank arm 62, which arm is operatively connected to shaft 61 by means of a spring biased pin 63 engaging a depression 69 in the left-hand sleeve portion of the shaft 61. The crank arm 62 is provided with a shell portion 68 to fit over the end of the shaft 61 and, when moved to the position shown, actuates the rod 64 to move the right hand portion of the clutch mechanism 74 to the position shown by means of the pin 65 secured to the rod 64. By thus disengaging the right hand member of the clutch mechanism 74, the pins 67 are not in operative engagement with the disc 75. It will be noted that pin 65 may slide in the slot 66 to bring the pins 67 in operative relation with the depressions in the disc 75. Further, the slot 66 is also of sufficient width to permit free angular movement of shaft 61 when the clutch mechanism is not in engagement. The width of the slot 66 is determined by the angular motion necessary for arm 62 for manual operation of the voting machine. Discs 75 and 76 are keyed to the shaft 61 and through the link members 77 and 78 operate the vote signal slide 78' and other devices of the machine.

The shell portion 68 of the crank arm 62 also engages a push rod connected to the upper portion of pivoted lever 150 thereby rotating this lever in a clockwise direction about the pivot 151 and against the bias of spring 152. Such movement of lever 150 actuates the five-pole switch S to the left, thereby bridging the middle and left hand contact fingers shown associated with switch S.

Assume that the crank arm 62 is in the position shown in Fig. 1, and that the mechanical parts of the machine are otherwise adjusted so that the machine is ready for election. Assume further that conductors 32 and 34 are suitably energized from a source of energy which may be the power supply of the community in which the election is taking place. Since the machine is ready for the voting operation and connected for manual control, the motor 55 and its associated parts will not be utilized. However, a small battery B is nevertheless utilized for energizing the lights 4 and 5 to indicate to the voter that he may cast his ballot. Lights 4 and 5, however, will not be energized until the judge has actuated the judge's push button or switch 16 and the voter has moved the curtain rods 85 and 86 to hide himself and the machine from the public.

Thus, when the voter wishes to cast his ballot, the election judge actuates the push button switch 16 thereby electrically unlocking the machine and also releasing the crank arm 62. The releasing circuit may be traced from the battery B through conductor 1, contact members 11, actuating coil 12 of the release mechanism, conductor 13, switch blade 14, conductor 15, the judge's push button switch 16, conductor 17, total-print lock-mechanism 18, conductor 19, switch blade 20 and conductors 21 and 10 to the negative terminal of the battery.

The purpose of the total-print lock is to take all desirable prints before any votes are cast to show that no votes are registered. Then when one or more votes have been cast any number of prints can be taken but thereafter no more votes can be cast.

In other words the total-print lock, placed in the circuit controlled by the judge's push button 16, is for the purpose of locking the machine to prevent any further use thereof after a print of the total number of ballots cast on a given machine has been taken. The total-print lock includes a pair of contact members, the left hand member of which is spring-biased to an open circuit position but is held in circuit closing position by the pivoted arm 153 which, when a print is taken, is actuated by a moving member 154 of the printing mechanism to such a position that the right hand portion of lever 153 enters the aperture 155, thereby permitting the opening of the contact members 18. This total-print lock-mechanism is locked and sealed within the machine and cannot be disturbed after a print has been taken until the machine is again taken back to election headquarters after the election is over and there opened by the proper keys.

From the foregoing discussion it is obvious that a false report or a false print of the total number of votes cast cannot be sent into headquarters without the knowledge of many of the citizens of the community, since obviously those who have not voted would be prevented from voting, because the machine is not operative.

After the judge has actuated the switch 16, coil 12 is, of course, energized and the arm 62 is thereby released so that the voter can operate the crank arm 62 to rotate the shaft 61 to close the curtains and energize the lights. To prevent the judge's interference with the voting operation, the crank arm releasing mechanism closes contact members 22, thereby shunting the judge's push button switch 16, since the coil 12 is then energized through contact members 22 to the energized conductor 17.

After these operations have been completed, the voter may cast his ballot. The candidate levers or operating means 92, as well as the party levers R, D and S, are so interlocked that the voter cannot operate any of these devices unless he first actuates the crank lever 62 to its full backward position. The contact members 11 are so designed that the full arcuate movement of the crank arm 62 causes opening of the circuit for coil 12 at contact members 11.

To initiate the casting of his ballot, the voter actuates the crank arm 62 to its full backward position, that is, rotates the crank arm in a counter-clockwise direction when viewed from the left to the right. The crank arm locking mechanism 24' is so positioned with reference to the crank arm 62 that the crank arm 62 will be locked into its extreme or full backward position and cannot be returned until the ballot has been properly cast. Operation of the crank arm 62 to the counter-clockwise position closes contact members 9 and thus establishes a circuit from the positive terminal of the battery B to conductors 1, 2 and 3, signal lights 4 and 5, conductor 6, switch blade 7 of switch S, conductor 8, contact members 9 and conductor 10 to the negative terminal of the battery. Since discs 75 and 76 are rotated by the operation of crank 62, the link members 77 and 78 move signal slide bar 78' upwardly. The reset bar 79 is thus moved vertically to release pin 80. The relation of the bridging member of contact members 9 to the links 77 and 78, and thus the reset bar, is such that pin 80 is released before contact members 9 are closed. This circuit traced is, therefore, not established before the reset bar 79 on the vote signal slide 78' has cleared or released pin 80. Since the lights 4 and 5 are thus energized, the voter is apprised of the fact that he may cast his ballot.

Before we proceed with a discussion of the casting of the ballot, it should be noted that conductor 23, before crank lever 62 is actuated, is energized from conductor 2, thus energizing retaining coil 24 through conductor 25, switch blade 26 of the switch S, conductor 27, conductor strap 104 of the vote interlock 28', contact members 28, conductor strap 102, contact members 29, conductor 30, switch blade 31 of switch S and conductor 21 to the negative terminal of the battery.

The vote interlock 28' includes the conductor straps 104, contact members 28, the conductor straps 102 and contact members 29.

As the voter actuates the crank arm 62, the discs 75 and 76 are operated, which discs through the links 77 and 78 operate vote signal slide 78' thereby moving the reset bar 79 upwardly to actuate the crank arm 82. The curtains are thus moved so as to close behind the voter. The movement of the reset bar 79 releases the pin 80 thereby permitting the spring biased vote interlock bar 81 to move towards the left. This operation of the bar 81 moves the pin 103 against the strap 104, thereby opening the circuit for the coil 24 at the contact members 28. It is, therefore, obvious that the spring actuated locking member 24' will be released and the crank arm 62 will be held in its operated position so long as the contact members 28 or the contact members 29 are in open circuit position.

The strap 104 of the vote interlock 28' are of spring construction and are biased to close contact members 28. If the reset bar 79 is moved to the position shown, contact members 28 may thus be reclosed, or if the bar 81 is moved towards the right by any other means, contact members 28 may be closed. The lower straps 102 of the vote interlock 28' are biased to open circuit position but the pin 101 holds the contact members 29 closed.

When any one of the party levers R, D or S is actuated, the pin 101 is moved upwardly and contact members 29 are moved to open circuit position and remain in such open circuit position as long as the particular party lever the voter may have actuated remains in an actuated position. Contact members 29, therefore, do not close until the party lever that has been actuated is returned to the position shown in Fig. 1, thereby reclosing the contact members 29.

Many voting machines are provided with party levers that automatically return to their initial or non-operated position. In this particular modification, spring 101' is shown which biases the vertically disposed rod 97 to a downward position and thus automatically re-positions any one of the party levers that may have been actuated by the voter. If, however, no spring 101' is provided or if for any reason the spring 101' should fail to operate, the voting operations cannot be completed unless the voter or the election judge returns the party lever to the position shown. This arrangement is a very valuable improvement, since "jamming" of the machine is thus prevented. Any error on the part of the voter, such as a failure to return the party lever to its original position before he attempts to operate the crank arm 62, cannot injure the machine, and with this arrangement the crank arm is locked in position until the party lever has been properly actuated automatically by spring 101' or manually by the lever itself that had been actuated. Furthermore, the locking member 24' is positioned adjacent the end of the handle and regardless of the force the voter may apply to the arm, no parts of the machine can be twisted or otherwise moved out of alignment by his efforts. It is thus obvious that neither inadvertent nor malicious abuse of the machine is permitted.

Assuming in the first instance that the voter is a staunch member of a given party and does not wish to split his ticket. He thereupon actuates any one of the party levers which represents the party with which he may be affiliated. This movement not only moves the pin 101 to an upward position, but the vote bar 99 is moved horizontally or toward the right by the pin 98 cooperating with a cam member on the bar 97. The pins 100 associated with each of the vertically disposed candidate bars 94 are thus moved upwardly and the cam surfaces 95 engage the pins 81', thereby moving the horizontal vote interlock bar 81 towards the right. It should be remembered that movement of the reset bar 79 releasing the vote interlock bar 81 caused a movement of the pins 81' towards the left by an amount sufficient to open the contact members 28 and also positioned the bar 81 so that it may be actuated by the cam surfaces 95 on the candidate bars 94.

Operation of the party lever sets all the mechanisms, or keys, associated with the respective counters for each candidate so that when the lever 62 is operated all the counters, for which mechanisms were set, may be operated. Since the counters and the mechanisms therefor, as well as the printing means associated with the counters, form no part of this invention and are of well known design no further and more detailed description is needed. Lest there be some doubt as to how voting machines count and record votes attention is called to the patent of J. A. Butler, April 6, 1915, No. 1,134,724, wherein structures are shown and described which may be utilized with my invention.

Further, movement of the party lever not only moves all of the candidate bars 94 upwardly, but also effects the opening of contact members 29 and the closing of contact members 28. The candidate levers are provided with suitable dents and remain in the raised position holding the bar 81 in position to maintain the contact members 28 closed, and also are not returned to their lowermost position by a movement of the party lever to close the contact members 29. If and when the contact members 29 are closed, either by the operation of the spring 101', if such spring be provided, or by the positive operation of the voter and since the casting of the ballot closed the contact members 28, the lock releasing coil 24 is again energized and the crank arm 62 may now be again actuated to its original position. The voter thereupon moves the crank arm 62 to its original position which operation places the reset bar 79 again in the position shown, and the cam portion of this bar engages the pin 80.

The mechanisms or keys, which are part of the voting machine and do not in themselves constitute part of this invention, and which mechanisms were set by the party lever, cooperate with crank arm 62 and thus cause all the counters for all the candidates of the party selected to be operated.

Figure 6:
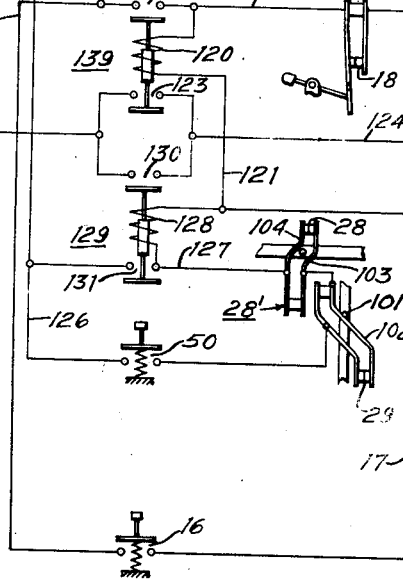
Fig. 6 is a detail showing how the registering devices are actuated.
Figure 6:
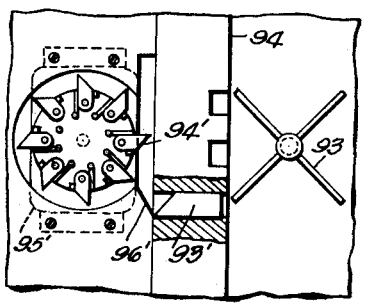

By the operation of the reset bar 79 the horizontal bar 81 is moved somewhat farther towards the right and all of the candidate bars 94 are released and thus returned to their original positions and in thus returning to their original positions the sliding dogs 93' on the respective bars, which were moved outwardly by the pinions 93, actuate the registering devices 95'. To gain a clearer picture of the operation, reference may be had to Fig. 6. If pinion 93 is actuated by a candidate voting means 92, the bar 94 is moved up, and the sliding dog is moved toward the left. As the dog 93' moves up the pivotally mounted dog 94' in the path of the dog 93' is temporarily moved counter-clockwise to permit the dog 93' to pass. When the bar 94 descends, the counting device 95' is operated and the dog 93' is positioned in the bar 94 by the cam 96' on the frame of the machine. Any votes cast for any other candidate for the same office will thus not move the dog out to actuate the counting mechanism.

Movement of the crank arm 62 to its original position causes the latch mechanism controlled by coil 12 to automatically lock arm 62 in the position shown and also causes the opening of the contact members 9, thereby opening the circuit for the signal lights 4 and 5. Furthermore, the movement of a crank arm 62 to its original position operates the bell-crank lever 82. The curtains are thus moved back and the voter may step away from the machine. The cycle may then be repeated by the operation of the judge's push button 16 and the proper operations of a second voter.

If the voter desires to split his ticket, the party levers are left in their original positions, that is, the positions shown in Fig. 1, and the necessary candidate bars 94 are actuated by the candidate voting means 92 cooperating with pinion 93 and the respective bars 94. With a voter who splits his ticket, the question of jamming the machine does not come up since the party levers are not moved at all, that is, contact members 29 remain in circuit closing position. The contact members 28 are, however, opened as heretofore discussed.

To briefly explain the cycle of manual operation of the devices disclosed in Fig. 1 when a voter votes a straight party ticket attention is called to Fig. 4 of the drawings.

The total-print-lock switch 18 and the switches 11, 28 and 29 are closed during the first or a step of the cycle, that is, before any operations take place.

In step b the judge's push button 16 is closed.

In step c the coil 12 is energized, releasing arm 62 and closing switch or contact members 22.

The voter now operates lever 62, closing the curtains and opening switches 11 and 28 as indicated in step d.

Immediately after the opening of switch 28, switch 9 is closed as indicated in step e. Opening of switch 28 causes the deenergization of coil 24 thereby locking bar 62 in the actuated position.

The voter is now at liberty to actuate one of the party levers and in doing so causes the opening of switch 29. See step f.

Operation of a party lever shifts the bar 81 toward the right, thus closing the switch 28, as indicated in step g.

The vertical bar 97 is automatically returned to the position shown thereby closing switch 29 and thus energizing coil 24 and thus releasing bar 62. Step h, thus, shows switches 18 and 29 closed.

By step i the arm 62 is returned to the initial position thus opening switch 9, counting the votes cast, and closing switch 11.

For a split ticket the sequence for casting a ballot is as shown in steps a to h, inclusive, of Fig. 5.

Steps a to i, shown in Fig. 4, or steps a to h shown in Fig. 5, are repeated by each voter until all the voters have cast their ballots. After all votes have been cast, the bar 154, part of the printing mechanism, moves to open switch 18 which deenergizes coil 12 and locks the machine so that no further votes can be cast regardless of the closing of the judge's switch 16.

For a split ticket the mechanisms, or keys, for each candidate are set individually by the operation of the candidate voting means 92. When the voter has operated as many of the means 92 and as selectively as he pleases, as long as he does not attempt to vote for the same candidate twice, or the same office over again for several parties, the crank arm 62 may be returned to its original position and the ballot is cast. Mechanical interlocks prevent voting twice for the same candidate or over again for the same office for several parties.

If the voter votes for at least one candidate, the crank arm 62 is released and he may, if he wishes, complete the voting operation. The voter is thus at liberty to vote for but one candidate or for as many as he likes, distributed over as many parties as he likes. The mechanical arrangements of the machine, not forming part of this invention, prevent him from voting for more than one candidate running for the same office.

Assume that for the locality in question, suitable power or electrical energy is provided so that the machine may be operated by a motor 55. For such actuation of the machine, the pin 63 is moved upwardly against the bias of its spring and the arm 62 is moved towards the left. Movement of the crank arm 62 and its associated part to the left causes the counter-clockwise rotation of mechanical interlocking lever 150, thereby positioning the five-pole switch S towards the right to interconnect the right hand vertical row of contact fingers with the middle row of contact fingers. This particular connection is shown in Fig. 2. However, since the modification shown in Fig. 2 is somewhat different the sequence of operation for motor controlled operation of the machine will be discussed in connection with Fig. 1.

From the foregoing discussion, it is obvious that the clutch mechanism 74 interconnects the discs 75 and 76 with the motor 55 which mechanical connection is effected through reduction gear 60, shaft 71, crank disc 72 and link mechanism 73.

For motor operation of the voting machine, let it be assumed that conductors 32 and 34 are suitably energized. A circuit is thus established from conductor 32 through the primary winding 33 of a transformer to conductor 34. Energization of the primary winding 33 causes the energization of the secondary winding 35 thereby establishing an energizing circuit for the signal lights 4 and 5. This circuit may be traced through conductors 2 and 3, signal lights 4 and 5, conductor 6, switch blade 7 and conductor 36 to the secondary of the transformer.

If the machine is otherwise in condition for election, the judge actuates his push button switch 16 thereby establishing a circuit from conductor 32, through conductor 37, spring biased contact members 38, conductors 39 and 40, switch blade 20, conductor 19, total-print lock 18, conductor 17, judge's push button switch 16, conductor 15, switch blade 14, conductor 41, back contact members 42 of motor starting switch 48, actuating coil 43 of control relay 44 to conductor 34. Energization of actuating coil 43 causes the closing of the contact members 45 which thus establish a holding circuit directly from energized conductor 39 through coil 43 to energized conductor 34, and the judge can, in no way, interfere with the subsequent operation of the voting machine by any manipulations he may effect at the push button switch 16.

Operation of the control relay 44 also causes the closing of contact members 46. Since the curtains have not closed the voter actuates the voter's push button 50, thereupon establishing a circuit from the energized conductor 32 through contact members 46, actuating coil 47 of starting switch 48, conductor 49, voter's push button switch 50 to the energized conductor 34.

Immediately after the operation of starting switch 48, the voter's push button switch is shunted at the contact members 51 of switch 48 and coil 47 remains energized as long as certain operating parts of the machine, notably spring bias switch 38, remains in the position shown.

Operation of the starting switch 48 establishes a circuit from the energized conductor 32 through contact members 52, conductor 53, armature 54 and field winding 56 of motor 55 to the energized conductor 34. A circuit in parallel with the armature and series winding of the motor 55 is also established through conductor 57 and brake-release coil 58. Energization of coil 58 releases the brake drum 59 and the motor may thus operate the voting machine to move the curtains to hide the voter from public view.

Since the mechanical interconnection of the motor with the shaft 61 has been described and because of the fact that manual operation of shaft 61 does not differ from the motor operation of shaft 61, the operation of such elements as crank arm 82, reset bar 79 and others need not again be discussed.

It will be noted that the operation of the motor 55 also drives the cam 70 in the clockwise direction. As cam 70 moves in the clockwise direction, the cam effects the closing of contact members 88 and immediately thereafter, the opening of the contact members 38. Opening of the contact members 38 causes the deenergization of coil 43 of the control relay 44, which in turn causes the deenergization of coil 47 of the starting switch 48. The motor circuit is thus interrupted and the energizing circuit for the magnetic brake is interrupted, and, in consequence, the motor and all the moving parts of the machine are instantly brought to rest by the brake.

The first operation of the two motor operations of the casting of one ballot causes the opening of the contact members 28 as heretofore explained in connection with the manual operation.

In the absence of any ballot being cast, actuation of the voter's push button 50 will thus not re-establish an energizing circuit for the starting switch 48. This is so because for the second operation of the motor to open the curtains and to complete the registering of the ballot cast by the voter, the coil 47 must be energized by a circuit extending from the energized conductor 32 through switch or contact members 88, conductor 89, switch blade 26, conductor 27, contact members 28 and 29, conductor 30, switch blade 31, conductor 90, back contact members 91 of control relay 44, actuating coil 47 of the starting switch 48, conductor 49 and voter's push button switch 50 to the energized conductor 34. It is thus obvious that the voter must at least cast one ballot before the curtain can be caused to open.

If the voter votes a straight party ticket, that is, actuates one of the parly levers, the vertical bar 97 and, in consequence, the vertical bars 94 will be actuated as heretofore discussed and unless the voter returns the party lever to its original position or it is automatically returned to its original position, contact members 29 remain open although contact members 28 may have been closed, and the motor cannot be started until the party lever that has been actuated is returned to its original position.

If the voter splits his ticket, the party levers remain in their original positions, however, the casting of at least one ballot moves the horizontal bar 81 towards the right thereby closing the contact members 28. If the voter is satisfied with but one vote, or the number of votes he may have cast in the split ticket, he can actuate the voter's push button 50 thereby establishing the energizing circuit last discussed for the starting switch 48 to start the motor 55.

After the operation of the starting switch 48, contact members 52 are closed and the motor circuit is established as heretofore explained. However, during the second operation of the motor, the reset bar 79 releases all of the candidate bars that may have been actuated and, furthermore, the cam 70 re-establishes the circuit conditions shown in Fig. 1 at switches 38 and 88.

The embodiment shown in Fig. 1 although very satisfactory for most operations and for almost every voter, does have the disadvantage that if a very nervous or speedy type of voter approaches the machine after he has initiated the operation of the motor 55 and such voter should cast at least one ballot before the motor has stopped, contact members 28 are moved to circuit closing position before contact members 38 have been opened. The control relay is thus again energized, the motor continues to operate, the curtains open, and the voter has had only a chance to vote for one or possibly two candidates. It should be remembered that this false operation can only be effected by some one who knows very thoroughly how to operate the machine and thus does not hesitate a moment, and furthermore, casts his ballot or at least the first one, very rapidly.

To obviate the defect or disadvantage just mentioned for the embodiment shown in Fig. 1, the modification shown in Fig. 2 has been devised. Corresponding parts in Fig. 2 have been given the same reference characters and obviously operate in the same manner as heretofore explained, in connection with the description and the sequence of operation presented for Fig. 1. An entire operation of the modification shown in Fig. 2 need, for this reason, not be discussed, and it will suffice if only the sequence of operation, illustrating the additional feature 9′, be explained.

If the machine is positioned for motor operation, that is, the crank arm 62 is disposed as indicated in Fig. 2, the contact members 11 are open and coil 12 is deenergized. Similarly, coil 24 is deenergized and the locking member 24′ may be utilized to lock the crank arm 62 in the inoperative position. It is, of course, obvious that the crank arm 62 need not necessarily be in the position indicated but may be entirely removed and placed within the tool box usually associated with the voting machine.

Assuming that the machine is otherwise in condition for the election and that spring 152 has actuated the switch S to the position shown, the election judge may actuate the judge's push button 16 thereby establishing a circuit from energized conductor 32 through conductor 37, contact members 38, conductors 39 and 40, switch blade 20, conductor 19, total-print lock 18, conductor 17, judge's push button or switch 16, conductor 15, switch blade 14, conductor 41, lock contact members 42 of safety relay 111′ and actuating coil 43 of control relay 44 to the energized conductor 34. Immediately after the operation of the control relay 44, the actuating coil 43 is energized directly from the energized conductor 39 through contact members 45 and 45′.

Before casting any ballot, the voter actuates the voter's push button switch 50, thereby establishing a circuit from the energized conductor 39 through contact members 45 of relay 44 actuating coil 47 of starting switch 48, conductor 49 and the voter's push button 50, to the energized conductor 34. Since the actuating coil 47 is energized, contact members 51, 52 close and contact members 91 open. The closing of the contact members 51 establishes a holding circuit for the actuating coil 47 so that any operation of the voter's push button after the operation of the starting switch 48 does in no wise influence the operation of the voting machine. It should be noted that a similar state of affairs obtains after the operation of the control relay 44. Because with the establishment of the holding circuit for the actuating coil 43, any operations of the judge's push button or switch 16 cannot interfere with the casting of a ballot.

The closing of the contact members 52 of switch 48 establishes the motor circuit in exactly the same manner as heretofore discussed for the showing in Fig. 1, and in consequence, the vote reset bar 79 is actuated and the contact members 28 are thereby opened. When the motor has rotated a definite amount during its first operation the contact members 88 are closed and immediately thereafter contact members 38 are opened. The closing of the contact members 88, even when the voter votes very rapidly, cannot cause the continued operation of the motor even though the contact members 28 and 29 may have been reclosed before the motor has ceased to operate. Assuming the voter did, in fact, vote very rapidly and contact members 28 and 29 are closed, the energizing circuit for coil 111 is nevertheless open at the contact members 91 since the starting switch 48 is still in its energized position. As soon as the switch 48 which controls the motor circuit has opened, a circuit is established from the energized conductor 32 through contact members 88, conductors 89 and 89', switch blade 31, conductor 30, contact members 29 and 28, conductor 27, switch blade 26, conductor 90, coil 111 of relay 111', conductor 112 contact members 91 of relay 48 to the energized conductor 34.

The closing of the contact members 113 thus makes the energization of actuating coil 111 independent of the operation of the starting switch 48, since the circuit through conductor 112 and contact members 91 is shunted by the circuit through contact members 113 and conductor 114. It should, of course, be apparent that regardless of whether the voter votes rapidly or at leisure, the operation will be the same, since the circuit for coil 111, in any case, will depend upon contact members 28, 29 and 91.

After the motor has performed its initial operations closing the curtain and establishing the circuit for the signal lights 4 and 5 through contact members 9' and opening the contact members 38, the energizing circuit for the coil 47 of the starting switch 48 is interrupted at the contact members 28 and the motor comes to rest very rapidly due to the magnetic brake associated with the motor.

Once the ballot has been cast, contact members 28 and 29 are again in circuit-closing position,—contact members 29 being in circuit closing position only if the party lever has been properly actuated—the motor may be again started by the actuation of the voter's push button switch 59. The circuit for the coil 47 may be traced from energized conductor 32 through contact members 88, conductor 89, contact members 115, actuating coil 47 of the starting switch 48, conductor 49 and voter's push button 50 to the energized conductor 34. The starting switch 48 is thus actuated and the motor completes the voting operation.

For the two embodiments shown in Figs. 1 and 2, provision is made for operating the machine electrically when possible. When power is off or not available, a battery may be utilized to supply energy for illuminating lights, but in such case a crank is provided for manual operation. Complete operation from a battery source may, in any instance, be a material advantage. From the standpoint of the voting public, a completely automatic or battery-operated machine would be preferable, since all machines would have the same method of operation and would be push-button operated rather than operated by a crank which requires considerable torque, and a long throw, an arrangement which may give women considerable difficulty.

From the standpoint of the voting official, the completely automatic or battery arrangement is desirable since the number of votes cast per hour per machine will be very materially increased; there will be no danger of delay as a result of the failure of power; there will be no exorbitant maintenance expense; and trouble, when it does arise, can be much easier located and serviced.

Furthermore, a completely automatic or battery-operated machine has further advantages because it is much more simple; has fewer parts, and is more positive in operation; many costly mechanical and electrical arrangements are rendered unnecessary; it will be much cheaper to build; and being simpler, will give much less field trouble.

The recitation of the advantages and merits of a completely automatic or battery-operated machine does not mean that the embodiments shown in Figs. 1 and 2 are not of value; in fact, the embodiment shown in Figs. 1 and 2 embody a system of control adapted to existing voting machines as now appear on the market—the type of voting machine which has been approved by some commonwealths. It is thus obvious that despite the merits and simplicity of a completely automatic voting machine,—except for the actual casting of the ballot,—the voting machines actually put in service throughout the country may not be thus operated, and the embodiments shown in Figs. 1 and 2 thus very materially improve and contribute to the safety and accuracy of the voting machine, and further, prevent inadvertent or malicious injury to the machine.

Figure 3:
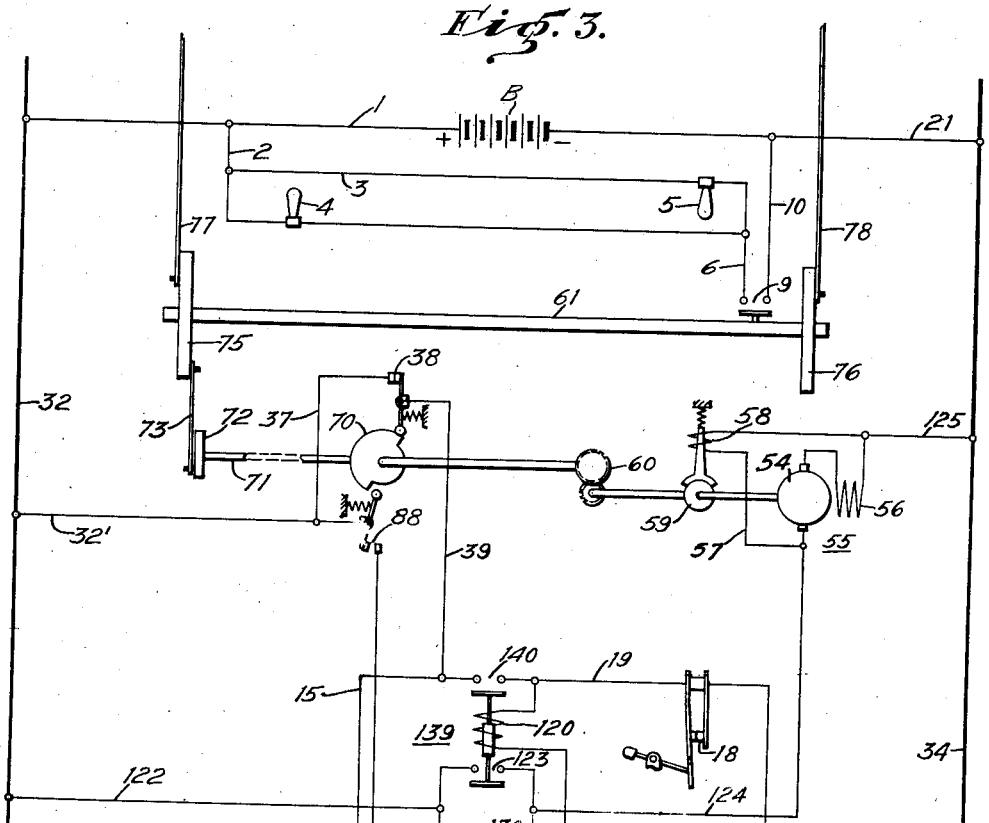
Fig. 3 is a diagrammatic showing of a control system for a motor operated voting machine, and, Figs. 4 and 5 indicate the sequence of operation of certain devices of the voting machine during typical casting of ballots.

Referring more particularly to the modification shown in Fig. 3, where B designates the battery from which the motor 55 is designed to operate. The mechanical interconnection of the motor with the operating parts of the voting machine is similar to that shown for the embodiments presented in Figs. 1 and 2 and need, therefore, not be discussed in detail. If the voter approaches the machine to vote, the judge actuates the push button switch 16 thereby establishing a circuit from the positively energized conductor 32 through conductors 32' and 37, contact members 38, conductors 39 and 15, judge's push button switch 16, conductor 17, total-print lock 18, conductor 19, actuating coil 120 of the starting switch 139 and conductors 121 and 21' to the energized conductor 34.

Operation of the starting switch 139 establishes a holding circuit for the coil 120 through the contact members 140. Closing of the contact members 123 establishes a circuit for the motor from the energized conductor 32 through conductor 122, contact members 123, conductor 124, the motor armature 54 and series field winding 56 and of motor 55 and conductor 125 to the energized conductor 34.

A circuit is also established through conductor 57 and actuating coil 58 of the brake thereby releasing the motor and permitting the motor to operate to close the curtains and to illuminate the signal lights 4 and 5 so that the voter can proceed with the casting of his ballot. It should be noted that with this completely automatic machine the starting of the motor is controlled by the judge's push button 16 and is not subject to the actuation of the voter's push button switch 50. The voter's operation is thus materially simplified, he merely has to know how to cast his ballot and to initiate the operation of the motor to open the curtains. After the initial operations of the motor have been completed, contact members 88 are closed and contact members 38 are opened, thereby disconnecting the motor from the battery. The brake associated with the motor immediately locks all of the moving parts in position so that none of the parts may be moved out of alignment during the casting of the ballot.

As soon as the voter has cast his ballot, thereby closing the contact members 28 and closing the contact members 29, he actuates the voter's push button 50 thereby establishing a circuit from the energized conductor 32' through contact members 88, conductor 126, voter's push button 50, contact members 28 and 29, conductor 127, actuating coil 128 of the starting switch 129 and conductor 21' to the energized conductor 34. Closing of contact members 131 shunts the vote interlock 28' and the voter's push button 50 by energizing coil 128 directly from conductor 126. Closing of contact members 130 establishes a circuit for the motor 55 and the motor again operates to complete the operation of the machine. When the motor has rotated through a predetermined angle contact members 38 are closed and contact members 88 are opened, thereby stopping the motor in position to be again started by the operation of the election judge when a second voter appears.

The advantages discussed for the modification shown in Fig. 2 are also present in Fig. 3, and by a much simpler arrangement. The voter cannot by rapidly casting his ballot cause the continued operation of the motor, but must actuate the voter's push button 50 to initiate the second operation of the motor.

It is, of course, obvious that other modifications may be devised and other circuit arrangements utilized to accomplish the novel results presented by my invention. However, it is understood that this invention is only to be limited by the scope of the appended claims and by the pertinent prior art.

I claim as my invention:

1. In an electrically controlled voting machine, the combination with a plurality of party levers, a plurality of candidate levers and motor means to operate said machine, of a vote interlock, means actuated from said motor means for operating said interlock to a given inoperative position, means for stopping the motor when the interlock has been thus operated, means responsive to the operation of at least one candidate lever or the proper operation of one party lever to place said interlock into operative position, a voter's controller, and means responsive to the operation of the controller for starting the motor to complete the voting operation and stop the motor.

2. In an electrically controlled voting machine, the combination with a motor for operating the machine, a plurality of party levers, a plurality of candidate levers, a judge's switch adapted to electrically release certain elements to be operated by the voter so that these elements may be operated by the voter, and a voter's switch for initiating the operation of the motor, of means for stopping the motor when the machine has been operated to a vote receiving position so that the votes may be received, means controlled by said voter's switch for restarting the machine, and a vote interlock responsive to the proper operation of any one of said levers to permit restarting of the motor through said last mentioned means to register the votes cast.

3. In an electrically controlled voting machine a judge's controller for placing the machine in operative condition so that a voter may vote, means controlled by said judge's switch to prevent the judge from interfering with the voting operation, a motor for operating the machine, a voter's controller for starting the motor to place the machine in condition to receive the votes, means for stopping the motor after the machine is in voting condition, a vote interlock, means responsive to the operation of the voter's controller to place said interlock in an inoperative position, a plurality of candidate levers, a plurality of party levers, means responsive to the operation of at least one of said candidate levers or the proper operation of one party lever to place the interlock in operative position, and means responsive to the voter's controller adapted to start the motor to complete the voting operation.

WILLARD G. COOK.